K. A. SIMMON.
BRAKING SYSTEM.
APPLICATION FILED JULY 13, 1914.
1,286,779.
Patented Aug. 14, 1917.
2 SHEETS—SHEET 1.
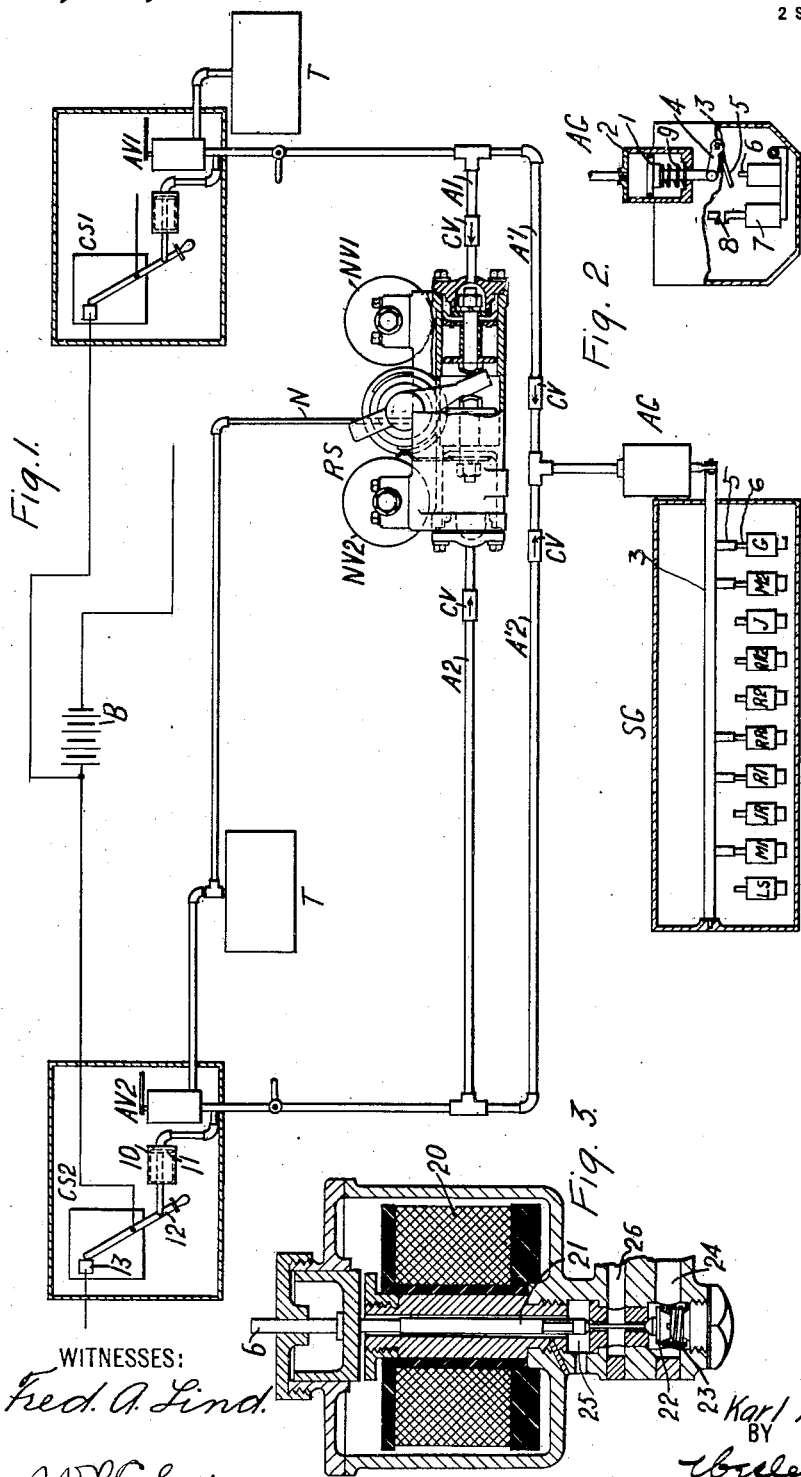
WITNESSES:
Fred. A. Lind.
W. R. Coley
INVENTOR
Karl A. Simmon.
BY
ATTORNEY K. A. SIMMON.
BRAKING SYSTEM.
APPLICATION FILED JULY 13, 1914.
1,236,779.
Patented Aug. 14, 1917.
2 SHEETS—SHEET 2.
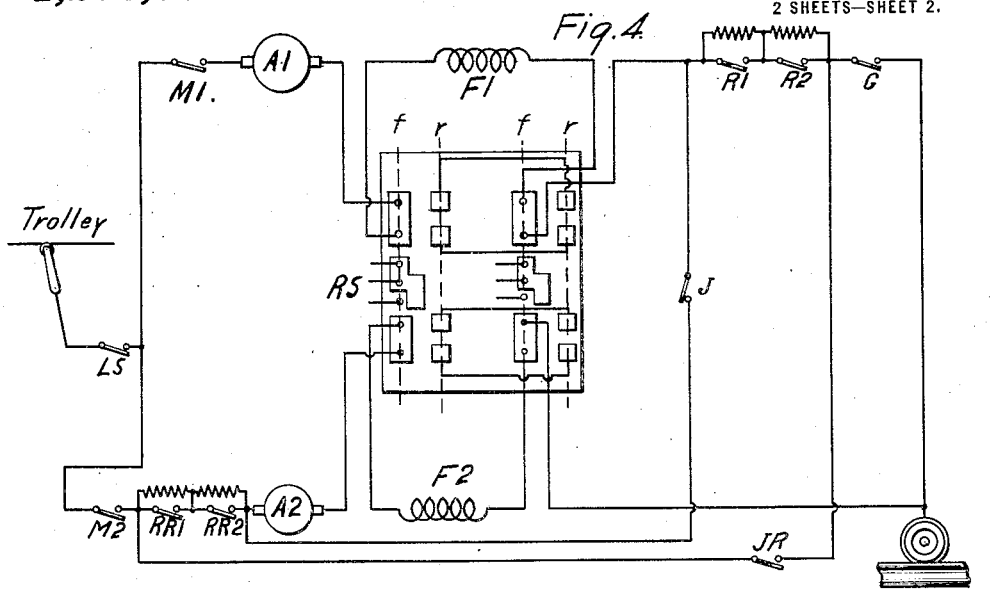
Fig. 4.
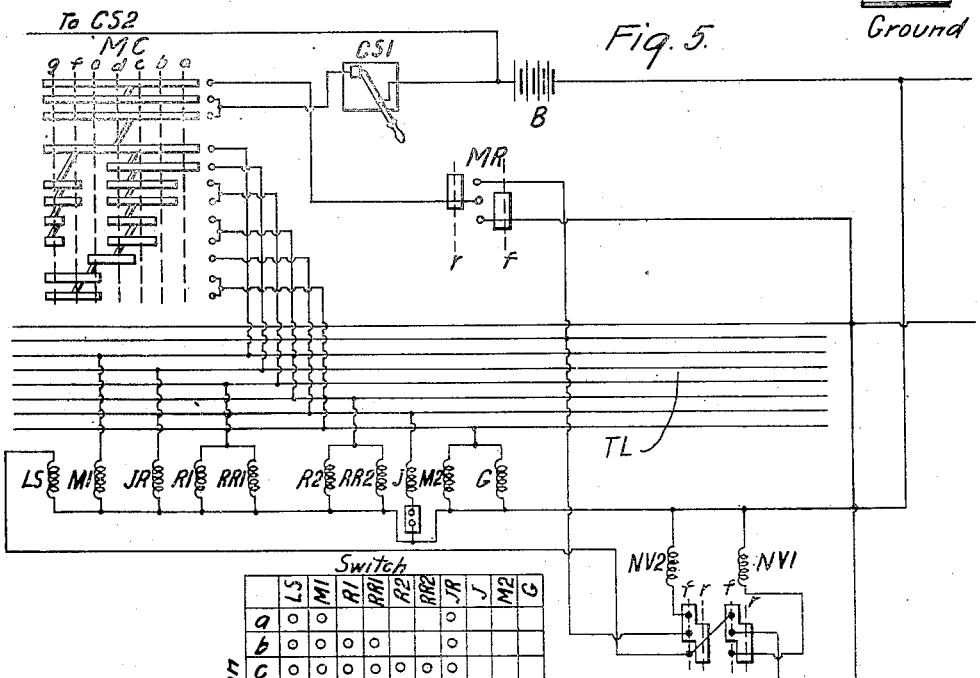
Fig. 5.
Fig. 6.
WITNESSES:
Fred A. Lind
W. R. Coley
INVENTOR
Karl A. Simmon.
BY
ATTORNEY

UNITED STATES PATENT OFFICE.

KARL A. SIMMON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

BRAKING SYSTEM.

1,236,779.

Specification of Letters Patent.

Patented Aug. 14, 1917.

Application filed July 13, 1914. Serial No. 850,754.

*To all whom it may concern:*

Be it known that I, KARL A. SIMMON, a citizen of the United States, and a resident of Edgewood Park, in the county of Allegheny and State of Pennsylvania, have invented a new and useful Improvement in Braking Systems, of which the following is a specification.

My invention relates to systems of control for electric motors, and it has special reference to auxiliary or emergency means for dynamically braking an electric railway vehicle or the like.

The object of my invention is to provide means for setting up dynamic braking, in certain classes of control systems, in an emergency, such as failure of the supply circuit voltage or inadequacy of the hand brakes, whereby the vehicle may be brought to rest or held at a safe speed when descending a grade.

Heretofore, it has been a more or less customary practice, in systems of motor control that embody pairs of motors permanently connected in parallel circuit relation and that employ purely hand-controlled operation without the use of auxiliary control circuits, to dynamically brake the vehicle by throwing the main circuit reverser, thus reversing the electrical relations of the field windings and corresponding armatures and causing local currents to circulate around the closed circuits formed by the respective pairs of motors. In many systems which employ the auxiliary control circuit referred to, it has not been possible to accomplish such braking unless the master reverser was thrown to its reverse position, and the master controller was momentarily moved to its first notch to electrically actuate the main reverser. However, in case the supply voltage failed, it has been impossible to so operate the main reverser, and it is to provide a braking system to meet such an emergency that the invention disclosed in a co-pending application of Clarence Renshaw, Serial No. 854,093, filed July 30, 1914, and assigned to the Westinghouse Electric & Manufacturing Company, is designed. In case the motors are not connected in permanent parallel relation, it will be understood that dynamic braking will not be set up unless a local circuit including the motors is formed.

According to my present invention, I provide auxiliary power-controlling, preferably fluid-pressure controlling means, operative from the respective ends of the vehicle, to actuate the main reverser independent of the regular control system, and to automatically and simultaneously cause the disconnection of the motors from the supply circuit and the connection of a local braking circuit to include the motors. My invention is most conveniently carried out in systems that employ the well-known " switch group," wherein electrically-governed, fluid-pressure controlling valves are alined within a suitable incasing member. In this case, a single auxiliary fluid-pressure operated member for actuating a suitable mechanical device to inaugurate emergency braking, is all the apparatus required, in addition to that already mentioned.

In the accompanying drawings, Figure 1 is a diagrammatic view of an auxiliary braking apparatus constructed in accordance with my invention; Fig. 2 is a diagrammatic view, partially in section and partially in elevation, of a portion of the apparatus shown in Fig. 1; Fig. 3 is a sectional detail view of another portion of the apparatus illustrated in Fig. 1; Fig. 4 is a diagrammatic view of the main circuits of a system of control that is adapted to employ my invention; and Fig. 5 is a diagrammatic view of the auxiliary control circuits for manipulating the various motor-controlling switches shown in Fig. 4 in accordance with the sequence chart of Fig. 6, which is of well-known form.

Referring to Fig. 1 of the drawing, the apparatus here shown comprises a suitable source of energy, such as a storage battery B, for supplying the auxiliary control system illustrated in Fig. 5; a plurality of control switches CS1 and CS2 for the auxiliary system that are preferably located at the respective ends of the railway vehicle; a fluid-pressure operated reversing switch RS, preferably of a familiar drum type and provided with controlling magnet valves NV1 and NV2; one or more tanks or reservoirs T for storing fluid pressure; a plurality of auxiliary valves AV1 and AV2, preferably located at the respective ends of the vehicles in proximity to the corresponding control switch, for supplying fluid pressure to the operating cylinder of the reversing switch RS under emergency conditions; a switch group SG of a well-known type, embodying a plurality of electrically-governed switches which are preferably of the type partially shown in Fig. 3; and a fluid-pressure operated device AG for effecting the actuation of certain of the switches in the switch group SG under conditions of emergency braking.

Referring to Fig. 2, the device AG comprises a fluid-pressure operated piston 1 which operates within a suitable cylinder 2 and is pivotally secured to a movable member 3 by means of a link 4, the member 3 being disposed longitudinally of the switch group SG, for a purpose hereinafter specified, and being provided, at points opposite certain switches, with a plurality of projecting members or cam surfaces 5. The various electrically-governed valves embodied in the switch group are severally provided with a projecting member or pin 6 which, when engaged by a member 5, is adapted to operate the valve to admit fluid pressure to the corresponding cylinder 7, of any well-known construction, for closing the associated coöperating main-circuit contact member 8. A suitable spring 9 is preferably provided for normally biasing the piston 1 and the cam members 5 out of engagement with the projecting pins 6 of the magnet valves embodied in the switch group. Inasmuch as the switch group SG is of an old and well-known type, no further general description thereof will be given.

The operation of the apparatus just described, without regard to the electrical changes effected thereby, may be set forth as follows: When it is desired to dynamically brake the vehicle in case of the emergency above referred to, the auxiliary valve AV1 or AV2, as the case may be, dependent upon the direction of travel of the vehicle, is operated to admit fluid pressure from the tank T through a suitably disposed check valve CV and a pipe A1 or a pipe A2, to the corresponding end of the operating cylinder of the reversing switch RS. The reverser is thus actuated to its reverse position. Simultaneously, fluid pressure is admitted to pipe A'1 or pipe A'2, and a suitable check valve CV to the fluid-pressure operated device AG, to thereupon actuate the piston 1 and the associated cam members 5 to engage the projecting pins 6 of certain of the magnet valves of the switch group, thereby admitting fluid pressure to the corresponding cylinders and closing the corresponding switches to form a local braking circuit to include the electric motors, as hereinafter described. The normal operation of the main circuit reverser RS is effected by admitting fluid pressure to the respective ends of the operating cylinder from the pipe N, upon the electric actuation of the magnet valve NV1 or the magnet valve NV2, as the case may be, the operation of the device AG being prevented by the interposition of the various check valves CV. Concurrently with the operation of the apparatus just described, fluid pressure is admitted directly from the auxiliary valve employed to a cylinder 10 to operate a therein-disposed piston 11 for effecting the separation of the coöperating movable and stationary contact members 12 and 13, respectively, of the switch CS1 or the switch CS2.

Reference may now be had to Fig. 3 of the drawings in which is shown an electrically governed magnet valve of the type preferably employed for the various motor-controlling switches and for electrically governing the reversing switch RS. The construction illustrated comprises a suitable energizing coil 20 that is adapted to actuate a centrally-disposed core 21, to the lower end of which is secured a suitable valve member 22. The valve member is disposed by a spring 23 to close a passage 24 which communicates with the tanks or reservoirs T. An exhaust chamber 25 is normally in communication with a second passage 26, which leads to the operating cylinder of the corresponding switch. Each projecting pin 6 is suitably secured to the upper end of the corresponding core 21, and is movable therewith. When the coil 20 is energized, the cores 21 and the valve member 22 are moved downwardly to admit fluid pressure from the passage 24 to the passage 26, and closing communication between the passage 26 and the exhaust chamber 25.

Referring to Fig. 4, the main circuit connections here shown comprise a supply circuit conductor marked "Trolley"; a return circuit conductor marked "Ground"; a plurality of motors respectively provided with armatures A1 and A2 and field windings F1 and F2; a plurality of motor-controlling switches LS, M1, M2, JR, J and G and including resistor short-circuiting switches R1, R2, RR1 and RR2; and certain electrical contact members of the reversing switch RS, which is adapted to simultaneously reverse electric relations of the field windings F1 and F2 with respect to the corresponding armatures. The motors are preferably mounted in any suitable manner, upon a railway vehicle of any desired type which, for purposes of simplicity and convenience, is not specifically shown.

In Fig. 5, the auxiliary control circuits shown comprise the battery B, a plurality of control switches CS1 and CS2 already referred to in connection with Fig. 1, a multi-position master controller MC and a master reverser MR preferably associated with each control switch, the actuating coils of the several switches illustrated in Fig. 4 and of the reversing switch RS, and a plurality of train line conductors TL for connecting the master controllers with the actuating magnet coils that are disposed upon one or more associated railway vehicles, in accordance with common practice.

Inasmuch as the normal operations of the systems illustrated in Figs. 4 and 5 are old and familiar in the art, it is not deemed necessary to give any detailed description thereof, the sequence chart of Fig. 6 being considered to sufficiently clearly set forth the operation of the system, in so far as acceleration and normal operation are concerned. However, in case it is desired to dynamically brake the vehicle, the auxiliary valve AV1 or the valve AV2, as the case may be, is manipulated to effect the operation of the reversing switch RS, the switch group SG and the control switch CS1 or the switch CS2, as described in connection with Fig. 1. The electrical relations of the field windings with respect to the corresponding armatures are thus reversed, for a well-known purpose, and the motors are disconnected from the supply circuit, since all of the switches open when their actuating coils are deënergized by the opening of the control switch. Were it not for the emergency actuation of certain switches in the switch group SG, it will be appreciated that no dynamic braking would occur, inasmuch as the motors are completely open-circuited. However, by the actuation of the switches M1, R1, RR1, M2 and G, as indicated in Fig. 1 by the positions of the respective cam members 5 and as also indicated in the sequence chart of Fig. 6 under the position marked "E", it will be observed that a local circuit, including the two motor armatures with their respective field windings and all of the accelerating resistors, is formed. Dynamic braking is thus immediately set up upon the actuation of the auxiliary valve AV1 or the valve AV2, and the vehicle may be readily brought to rest or maintained at a safe speed when descending a grade.

It will be understood that the resistors included in the local braking circuit is not limited to the particular number illustrated, but may include a smaller or larger number, dependent upon the relative rate of retardation that is desired.

I do not wish to be restricted to the specific arrangement of parts or structural details herein set forth, as many variations thereof may be made within the spirit and scope of my invention. I, therefore, desire that only such limitations shall be imposed as are indicated in the appended claims.

I claim as my invention:

1. In a system of control, the combination with a plurality of motors having armature and field windings, a set of switches and a plurality of motor-control circuits, of means for substantially simultaneously breaking the control circuits, reversing the electrical relations of the various field and armature windings and operating predetermined switches of said set for effecting a closed circuit through the motors to set up dynamic braking.

2. In a system of control, the combination with a plurality of electric motors severally provided with field windings and armatures, and fluid-pressure operated means for reversing the electrical relations of the field winding and armature of each motor, of auxiliary fluid-pressure controlling means for effecting said reversing, under predetermined conditions, and other auxiliary power-operated means for effecting the connection of one or more of said motors in a closed circuit to thereupon set up dynamic braking.

3. In a system of control, the combination with a railway vehicle adapted to be driven by a plurality of electric motors severally provided with field windings and armatures, and power-operated means for reversing the electrical relations of the field winding and the armature of each motor, of auxiliary power-controlling means operative from a plurality of points in the vehicle for effecting said reversing, under predetermined conditions, and other axiliary means for effecting a closed circuit through the motors to thereupon set up dynamic braking.

4. In a system of control, the combination with a railway vehicle adapted to be driven by a plurality of electric motors severally provided with field windings and armatures, and fluid-pressure operated means for reversing the electrical relations of the field winding and armature of each motor, of auxiliary fluid-pressure controlling means operative from the respective ends of the vehicle for effecting said reversing, under predetermined conditions, and other auxiliary fluid-pressure operated means for effecting the connection of one or more of said motors in a closed circuit to thereupon set up dynamic braking.

5. In a system of control, the combination with a supply circuit, a railway vehicle adapted to be driven by a plurality of electric motors severally provided with field windings and armatures, fluid-pressure operated means for reversing the electrical relations of the field winding and armature of each motor, and plural means for effecting acceleration of said motors, of a plurality of auxiliary fluid-pressure controlling means operative from a plurality of points in the vehicle for disconnecting said motors from the supply circuit and for effecting said reversing, and other auxiliary fluid-pressure operated means for actuating certain of said plural means to form a local braking circuit with one or more of said motors.

6. In a system of control, the combination with a supply circuit, a railway vehicle adapted to be driven by a plurality of electric motors severally provided with field windings and armatures, main circuit resistors, a plurality of motor-controlling switches, including resistor short-circuiting switches, for effecting acceleration and normal operation of the motors, a plurality of actuating magnet coils for said switches, a controller for governing the energization of said coils, a switching device for connecting said supply circuit to said controller, and a fluid-pressure operated device for reversing the electrical relations of the field winding and armature of each motor, of auxiliary fluid-pressure controlling valves located at the respective ends of the vehicle for opening said switching device and for effecting the actuation of said fluid-pressure operated device, a movable piston, an operating cylinder therefor communicating with said valves, and means associated with said piston for closing certain of said switches to form a local braking circuit with one or more of said motors.

7. In a system of control, the combination with a supply circuit, a railway vehicle adapted to be driven by a plurality of electric motors severally provided with field windings and armatures, a plurality of main circuit resistors, a switch group comprising a plurality of motor-controlling fluid-pressure operated switches, including resistor short-circuiting switches, for effecting acceleration and normal operation of the motors, each switch being provided with a valve member for governing the admission and release of fluid-pressure, a plurality of actuating magnet coils for the valve members of said switches, a master controller for governing the energization of said coils, a switching device for connecting said supply circuit to said controller, and a fluid-pressure operated device for reversing the electrical relations of the field winding and armature of each motor, of auxiliary fluid-pressure controlling valves located at the respective ends of the vehicle for opening said switching device to disconnect the motors from the supply circuit and for effecting the actuation of said fluid-pressure operated device, a movable piston, an operating cylinder therefor communicating with said valves, a movable member disposed longitudinally of said switch group and operatively connected to said piston, and a plurality of cam members severally secured to said movable member for actuating the valve members of certain of said switches to admit fluid-pressure substantially simultaneously with the actuation of said device to close the switches and form a local braking circuit with one or more of said motors.

8. In a system of control, the combination with a motor having an armature and a field winding, a set of switches and a plurality of motor-control circuits, of means for substantially simultaneously breaking the control circuits, reversing the electrical relations of the field winding and the armature, and operating predetermined switches of said set for effecting certain circuit connections to thereupon set up dynamic braking.

9. In a system of control, the combination with a motor having an armature and a field winding, a set of switches and a plurality of motor-control circuits, of fluid-pressure-operated means for substantially simultaneously breaking the motor-control circuits, reversing the electrical relations of the field winding and the armature and operating predetermined switches of said set for effecting certain circuit connections to thereupon set up dynamic braking.

10. In a system of control, the combination with a railway vehicle adapted to be driven by a plurality of electric motors severally provided with field windings and armatures, and means for reversing the electrical relations of the field winding and armature of each motor, of auxiliary means operated from the respective ends of the vehicle for effecting said reversing under predetermined conditions, and other auxiliary means for effecting the connection of said motors in a single closed circuit to thereupon set up dynamic braking.

11. In a system of control, the combination with a motor having an armature and a field winding and a plurality of motor-control circuits, of fluid-control means for reversing the electrical relations of the field winding and the armature, fluid-controlled means for breaking the motor-control circuits, and auxiliary fluid-pressure means for effecting the connection of said motors in a closed circuit to thereupon set up dynamic braking.

12. In a system of control, the combination with a plurality of motors having armatures and field windings, a set of switches and a plurality of motor-control circuits, of means for substantially simultaneously and independently breaking the control circuits, reversing the electrical relations of the field windings and the armatures and operating predetermined switches of said set for effecting certain circuit connections to thereupon set up dynamic braking.

In testimony whereof, I have hereunto subscribed my name this 6th day of July, 1914.

KARL A. SIMMON.

Witnesses:
D. H. MACE,
B. B. HINES.